US010448210B2

(12) United States Patent
Pandey et al.

(10) Patent No.: US 10,448,210 B2
(45) Date of Patent: Oct. 15, 2019

(54) DETERMINING LOCATION VIA WIRELESS ACCESS POINTS

(71) Applicant: CISCO TECHNOLOGY, INC., San Jose, CA (US)

(72) Inventors: Santosh Pandey, Newark, CA (US); Rong Peng, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/136,185

(22) Filed: Sep. 19, 2018

(65) Prior Publication Data

US 2019/0020977 A1    Jan. 17, 2019

Related U.S. Application Data

(63) Continuation of application No. 15/602,391, filed on May 23, 2017, now Pat. No. 10,104,503, which is a
(Continued)

(51) Int. Cl.
*H04W 4/02* (2018.01)
*H04B 17/318* (2015.01)
(Continued)

(52) U.S. Cl.
CPC ............ *H04W 4/023* (2013.01); *G01C 21/26* (2013.01); *G01S 5/0054* (2013.01);
(Continued)

(58) Field of Classification Search
CPC ..... H04W 4/023; H04W 64/00; H04W 4/026; H04W 4/029; H04W 4/04; H04B 17/318;
(Continued)

(56) References Cited

U.S. PATENT DOCUMENTS 9,693,194 B2 *   6/2017   Pandey ................. H04W 4/023
10,104,503 B2 * 10/2018   Pandey ................. H04W 4/023
(Continued)

FOREIGN PATENT DOCUMENTS

WO    2014047352 A2    3/2014
WO    2017048816 A1    3/2017

OTHER PUBLICATIONS

Kaleve, "International Search Report and Written Opinion issued in International Application No. PCT/US2016/051693", dated Dec. 13, 2016, 13 pages.
(Continued)

*Primary Examiner* — Diane D Mizrahi
(74) *Attorney, Agent, or Firm* — Johnson, Marcou & Isaacs, LLC

(57) ABSTRACT

Determining a location of a user device comprises a wireless computing system supported by an access point. The wireless computing system receives a signal from the user device. The system estimates a location of the user device based on RSSI and calculates a boundary around the estimated location. The wireless computing system selects a plurality of sections inside of the boundary and performs a coarse calculation of a location of the user device based on an angle of arrival of the received signal. The system determines sections of the plurality of sections that have results from the coarse calculation that are more likely to be a location of the user device. The system performs a fine calculation of the location based on the angle of arrival of the received signal within each of the sections. The system identifies a particular section as the location of the user device.

18 Claims, 9 Drawing Sheets

Related U.S. Application Data continuation of application No. 15/077,875, filed on Mar. 22, 2016, now Pat. No. 9,693,194.

(60) Provisional application No. 62/218,546, filed on Sep. 14, 2015.

(51) Int. Cl.

| | | |
|---|---|---|
| *G01C 21/26* | (2006.01) | |
| *G01S 5/00* | (2006.01) | |
| *G01S 5/02* | (2010.01) | |
| *H04W 64/00* | (2009.01) | |
| *G01S 5/04* | (2006.01) | |
| *G01S 5/14* | (2006.01) | |

(52) U.S. Cl.
CPC .......... *G01S 5/0268* (2013.01); *G01S 5/0278* (2013.01); *H04B 17/318* (2015.01); *H04W 64/00* (2013.01); *G01S 5/04* (2013.01); *G01S 5/14* (2013.01)

(58) Field of Classification Search
CPC .... G01S 5/0054; G01S 5/0268; G01S 5/0278; G01S 5/04; G01S 5/14
See application file for complete search history.

(56) References Cited

U.S. PATENT DOCUMENTS

| | | |
|---|---|---|
| 2004/0143428 A1 | 7/2004 | Rappaport et al. |
| 2004/0180671 A1 | 9/2004 | Spain et al. |
| 2004/0236547 A1 | 11/2004 | Rappaport et al. |
| 2005/0136845 A1 | 6/2005 | Masuoka et al. |
| 2008/0191941 A1 | 8/2008 | Saban et al. |
| 2010/0302102 A1 | 12/2010 | Desai et al. |
| 2016/0232627 A1* | 8/2016 | Smith ............. G06F 16/29 |
| 2017/0053529 A1 | 2/2017 | Yokoyama et al. |
| 2017/0078843 A1 | 3/2017 | Pandey et al. |
| 2017/0178102 A1* | 6/2017 | Wang ............. G06Q 20/202 |
| 2017/0257746 A1 | 9/2017 | Pandey et al. |
| 2018/0070213 A1* | 3/2018 | Ali ............. H04W 4/029 |

OTHER PUBLICATIONS

Mizrahi, "Office Action issued in U.S. Appl. No. 15/077,875 filed Mar. 22, 2016", dated Nov. 1, 2016, 11 pages.
Mizrahi, "Office Action issued in U.S. Appl. No. 15/602,391 filed May 23, 2017", dated Mar. 6, 2018, 13 pages.
Mizrahi, "Office Action issued in U.S. Appl. No. 15/602,391 filed May 23, 2017", dated Sep. 27, 2017, 15 pages.
Moon, "International Preliminary Report on Patentability in International Application No. PCT/US2016/051693", dated Mar. 20, 2018, 8 pages.

* cited by examiner

DETERMINING LOCATION VIA WIRELESS ACCESS POINTS

RELATED APPLICATIONS

This patent application is a continuation of and claims priority to U.S. patent application Ser. No. 15/602,391, filed May 23, 2017 and entitled "Determining Location Via Wireless Access Points" which is a continuation of and claims priority to U.S. patent application Ser. No. 15/077,875, filed Mar. 22, 2016 and entitled "Determining Location Via Wireless System Access Points" and claims priority to U.S. Provisional Patent Application No. 62/218,546, filed Sep. 14, 2015 and entitled "Determining Location Via Wireless System Access Points." The entire contents of the above-identified priority applications are hereby fully incorporated herein by reference.

TECHNICAL FIELD

This disclosure relates to determining a computing device location via wireless access points and more specifically to using received signal strength and signal angle of arrival to determine the location of the computing device with respect to the wireless access points.

BACKGROUND

Wireless computing systems that provide Internet services and other wireless signal services to user computing devices, such as mobile smartphones, are deployed in many public locations. For example, a mall or a hotel may deploy a wireless access point to provide a wireless network connection to a user computing device. A facility may provide multiple wireless access points to cover a larger area. For example, a sports arena may provide many wireless access points to allow wireless network access for users throughout the facility.

A conventional wireless computing system may use the wireless access points to determine a location of a particular user computing device and offer services to the particular user computing device based on the determined location. In an example, the location of the particular user computing device may be employed by the particular user computing device when accessing a mapping application or a shopping application. Errors in the determined location may result in providing incorrect or incomplete services to the particular user computing device.

DESCRIPTION OF THE EXAMPLE EMBODIMENTS

Overview

In an example embodiment, a user enters a location having a wireless computing system. The wireless computing system includes a wireless access point ("AP"). Multiple APs may be deployed to improve the coverage area of the wireless computing system. One or more APs receive a signal from a user computing device. The signal may be in response to a beacon signal provided by the APs. The wireless computing system estimates a location of the user computing device based on a result of a calculation based on a received signal strength indicator ("RSSI") for the signal received by the one or more APs from the user computing device. The wireless computing system defines a boundary encompassing the estimated location of the user computing device. The boundary may be a square, rectangle, or other regular or irregular shape encompassing an area based on an accuracy of the estimated location result. Performing the RSSI location calculation first and generating a boundary encompassing the estimated location limits an amount of outlier results that may be created by noise or other false signals for subsequent location calculations based on signal angle of arrival.

The wireless computing system divides the area inside the boundary into multiple sections. The number of sections may be based on a size of the boundary and the encompassed area. For example, the boundary may be divided into 16 or 20 sections. More or less sections may be used for larger or smaller areas, respectively. The wireless computing system performs a coarse calculation of a location of the user computing device within each of the sections inside the boundary based on the angle of arrival of the signal received by the one or more APs from the user computing device. The angle of arrival of the signal to multiple APs may be used in the calculation.

The wireless computing system selects one or more sections within the boundary that have results from the coarse calculation that are more likely than other sections to be an actual location of the user computing device. For example, the wireless computing system may select the top ten sections or other portion of the best results. Then, the wireless computing system performs a fine calculation of a location of the user computing device within each of the selected sections. The fine calculation is also based on the angle of arrival of the received signal. The wireless computing system identifies a particular section of the selected sections that has results from the fine calculation that are more likely to be the actual location of the user computing device and communicates location data related to the identified particular section to the user computing device.

Example System Architectures

Turning now to the drawings, in which like numerals represent like (but not necessarily identical) elements throughout the figures, example embodiments are described in detail.

Figure 1:
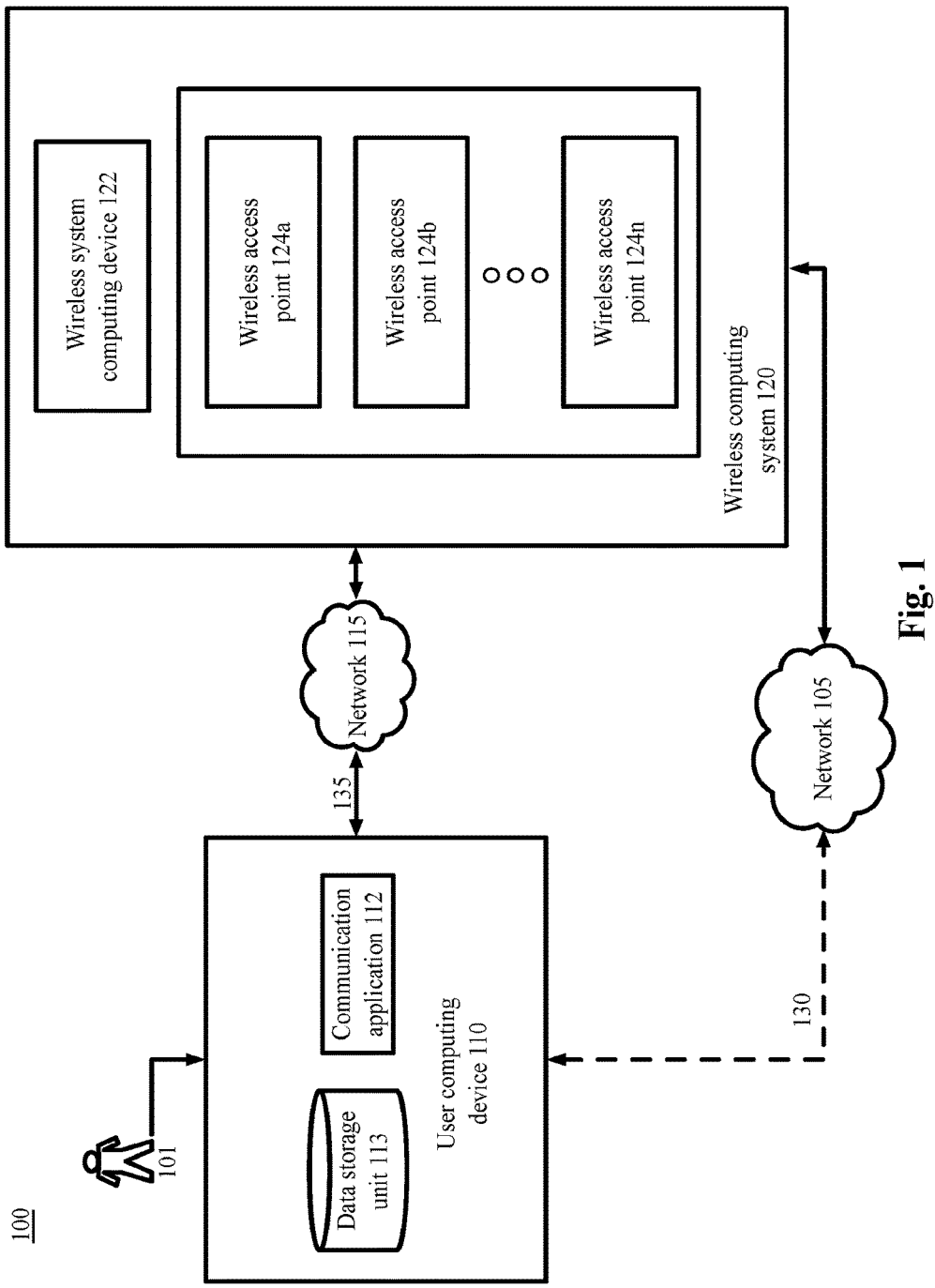
FIG. 1 is a block diagram depicting a system to determine a location of a user computing device, in accordance with example embodiments.

FIG. 1 is a block diagram depicting a system 100 to determine a location of a user computing device 110, in accordance with example embodiments.

As depicted in FIG. 1, the system 100 includes a user computing device 110 and a wireless computing system 120 that are configured to communicate with one another via one or more networks 105, 115 or via any suitable communication technology. The wireless computing system 120 employs one or more wireless access points ("APs") 124a-n. Three APs 124a, 124b, and 124n are depicted in FIG. 1. However, the wireless computing system 120 may include any suitable number of APs 124 as configured for a particular wireless computing system 120. The APs 124a-n may sometimes be identified throughout this specification individually as APs 124a-n or collectively as AP 124n.

Each network, such as network 105 and 115, includes a wired or wireless telecommunication mechanism or protocol by which the components depicted in FIG. 1 can exchange data. For example, each network 105, 115 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, it should be understood that the terms "data" and "information" are used interchangeably herein to refer to text, images, audio, video, or any other form of information that can exist in a computer-based environment. The communication technology utilized by the components depicted in FIG. 1 may be similar to network technology used by network 105, 115 or an alternative communication technology.

Each component depicted in FIG. 1 includes a computing device having a communication application capable of transmitting and receiving data over the network 105, 115 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the user computing device 110 is operated by an end-user or consumer 101, and the wireless computing system 120 is operated by a wireless computing system operator (not depicted).

As shown in FIG. 1, the user computing device 110 includes a data storage unit 113 accessible by a communication application 112. The example data storage unit 113 can include one or more tangible computer-readable storage devices. The data storage unit 113 can be disposed on the user computing device 110 or can be logically coupled to the user computing device 110. For example, the data storage unit 113 can include on-board flash memory and/or one or more removable memory devices or removable flash memory. In example embodiments, the data storage unit 113 may reside in a cloud based computing system. The data storage unit 113 may store instructions executable by the user computing device 110 to perform the functions described herein.

In an example embodiment, the communication application 112 of the user computing device 110 communicates with the APs 124n over the network 115 via communication path 135 using Wi-Fi or other wireless communication technology, such as Bluetooth, infrared, or any other suitable technology. The user computing device 110 may access the Internet or other systems via the APs 124n. In an example embodiment, when the user computing device 110 communicates with the wireless computing system 120 via the network 115, the user computing device 110 may access the network 105 via the wireless computing system 120. That is, the user computing device 110 may utilize the wireless computing system's 120 connection to the network 105 to access the Internet or any other system or device.

In an alternate example embodiment, the communication application 112 communicates with the Internet, the wireless computing system 120, or other suitable systems or devices, via a connection to the network 105 along communication path 130. The communication path 130 may be a cellular communication technology or any other suitable technology, such as Wi-Fi. The user computing device 110 may utilize communication path 130 to network 105 to communicate when the communication path 135 via network 115 is not available. For example, if the user computing device 110 is out of range of a signal from APs 124n, then the user computing device 110 may instead use a cellular connection to network 105 via communication path 130. In an example, the user computing device 110 may use communication path 135 via network 115 as a path to access the Internet because this connection, such as a Wi-Fi connection, may consume less of the bandwidth, battery power, or data allowance of the user computing device 110.

The communication application 112 on the user computing device 110 may be, for example, a web browser application or a stand-alone application, to view, download, upload, or otherwise access documents or web pages via the network 105, 115. The communication application 112 can interact with web servers or other computing devices connected to the network 105.

In some embodiments, the user 101 associated with a user computing device 110 can install an application and/or make a feature selection to obtain the benefits of the techniques described herein.

As shown in FIG. 1, the wireless computing system 120 includes a wireless system computing device 122 and the APs 124a-n. The wireless system computing device 122 may be a server or other device that is used to perform the computing functions of the wireless computing system 120 and to coordinate communication to/from the APs 124a-n. In an example, the wireless system computing device 122 is used to configure the wireless technologies utilized by the APs 124. The wireless system computing device 122 stores received data, performs calculations related to the location of the user computing device 110, or performs any other suitable actions. Any other computing or storage function required by the wireless computing system 120 may be performed by the wireless system computing device 122.

Any function performed in the methods described herein by the AP 124n may be performed by any one or more of the APs 124a, 124b . . . 124n, unless otherwise specified. Any function performed in the methods described herein by the APs 124n may be performed by the wireless system computing device 122 or other computing system associated with the APs 124*n*. Any function performed in the methods described herein by the wireless system computing device 122 may be performed by one or more of the APs 124*n* or other computing system associated with the APs 124*n* or the wireless computing system 120.

Each AP 124*n* comprises hardware and software to communicate with the user computing device 110 or the network 105 via any suitable communication technology. For example, each AP 124*n* may utilize an antenna or other hardware to improve transmission/reception of wireless signals. Each AP 124*n* may communicate with the network 105, 115 or the user computing device 110 via Wi-Fi or other wireless communication technology, such as Bluetooth, infrared, cellular, or any other suitable technology. The APs 124*n* may be in communication with a wireless system computing device 122 that manages the operations of the APs 124*n*. The APs 124*n* may be wired or otherwise logically coupled to the wireless system computing device 122 to allow access to the network 105 or for any other suitable purpose. The calculation functions or other processing functions of the APs 124*n* may be performed by a processor or other computing system onboard the APs 124*n* or at the wireless system computing device 122. Additionally, the functions of the wireless system computing device 122 may be performed by each AP 124*n*.

Figure 9:
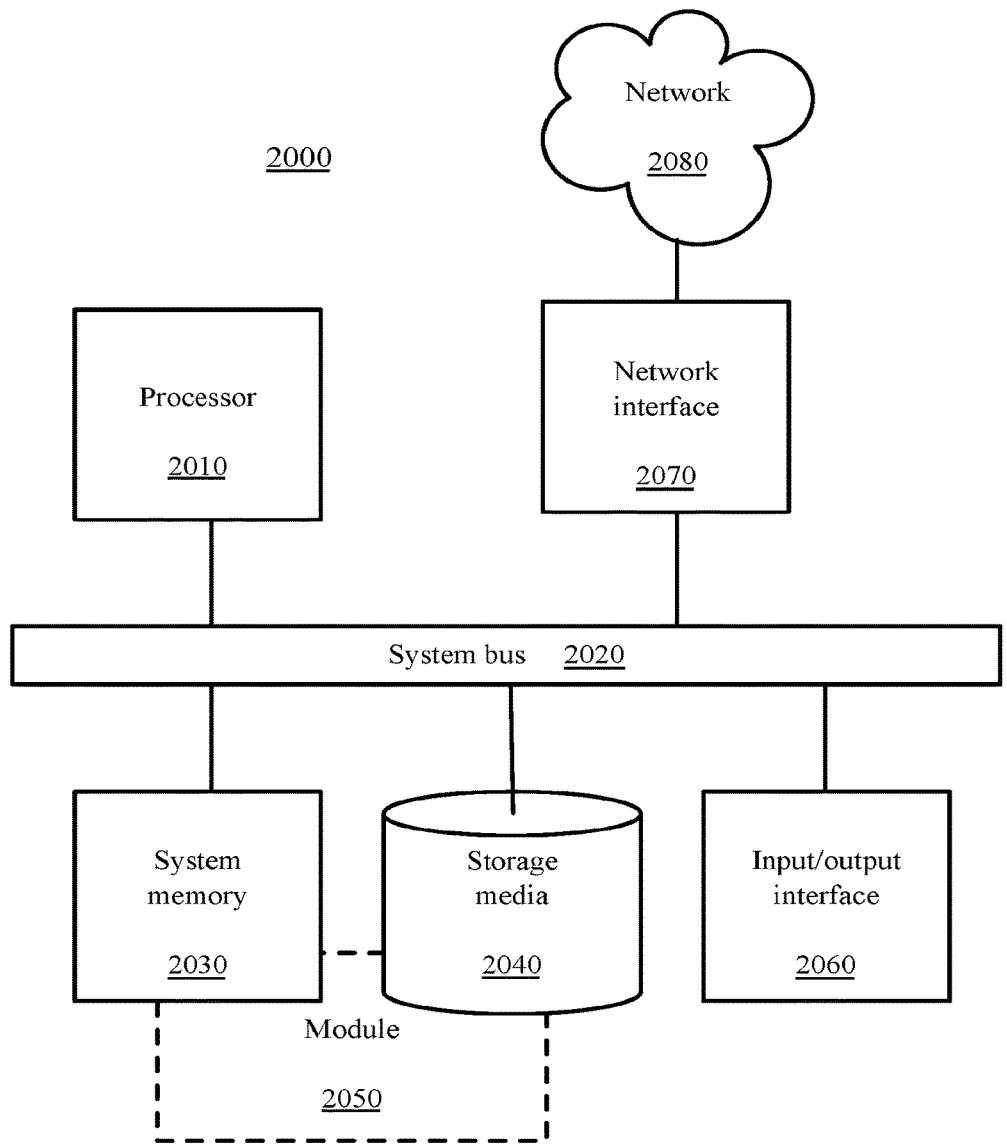
FIG. 9 is a block diagram depicting a computing machine and a module, in accordance with example embodiments.

In example embodiments, the network computing devices and any other computing machines associated with the technology presented herein may be any type of computing machine such as, but not limited to, those discussed in more detail with respect to FIG. 9. Furthermore, any functions, applications, or components associated with any of these computing machines, such as those described herein or any other others (for example, scripts, web content, software, firmware, hardware, or modules) associated with the technology presented herein may by any of the components discussed in more detail with respect to FIG. 9. The computing machines discussed herein may communicate with one another, as well as with other computing machines or communication systems over one or more networks, such as network 105, 115. The network 105, 115 may include any type of data or communications network, including any of the network technology discussed with respect to FIG. 9.

Example Processes

Figure 2:
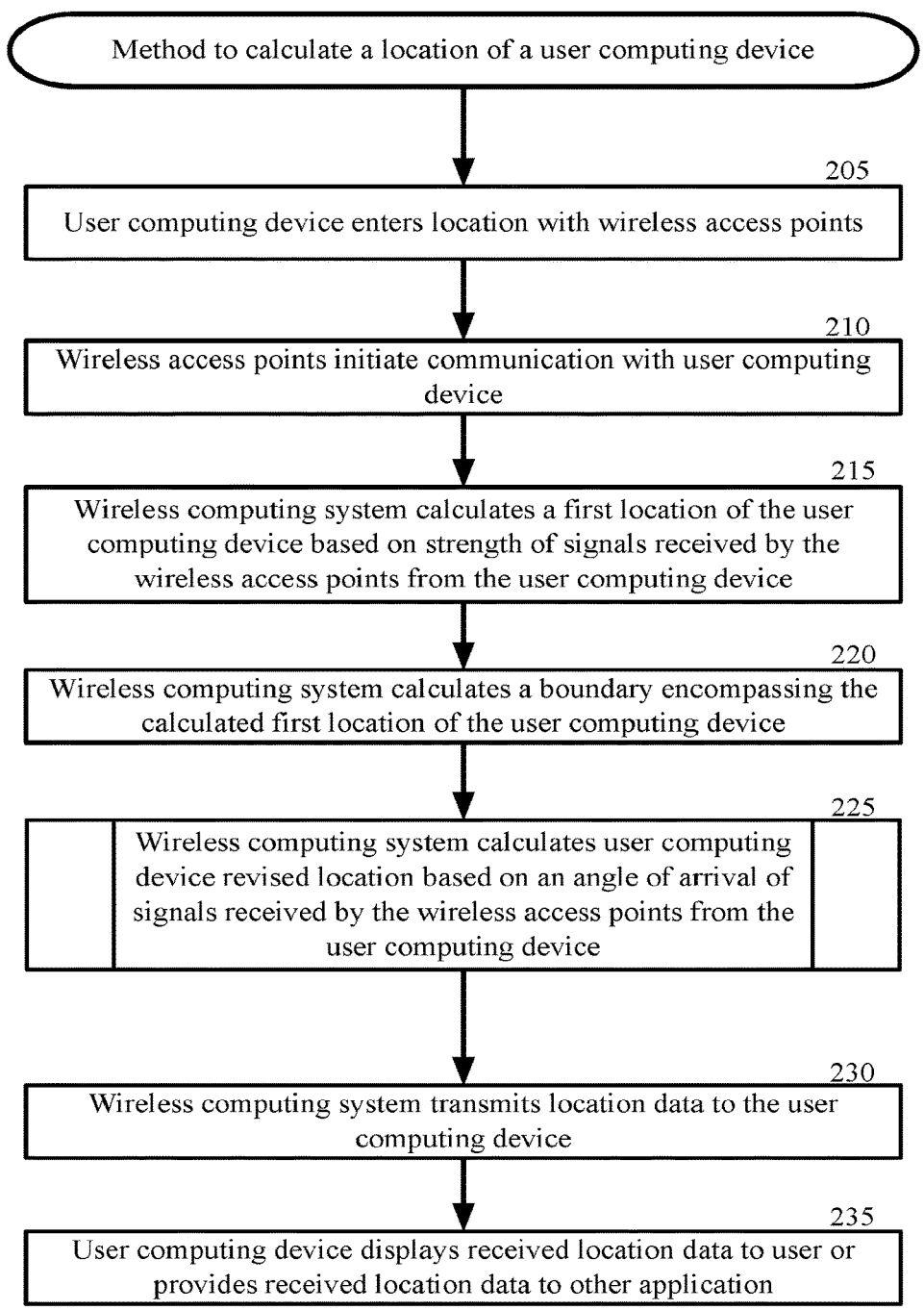
FIG. 2 is a block flow diagram depicting a method to determine a location of a user computing device, in accordance with example embodiments.
Figure 3:
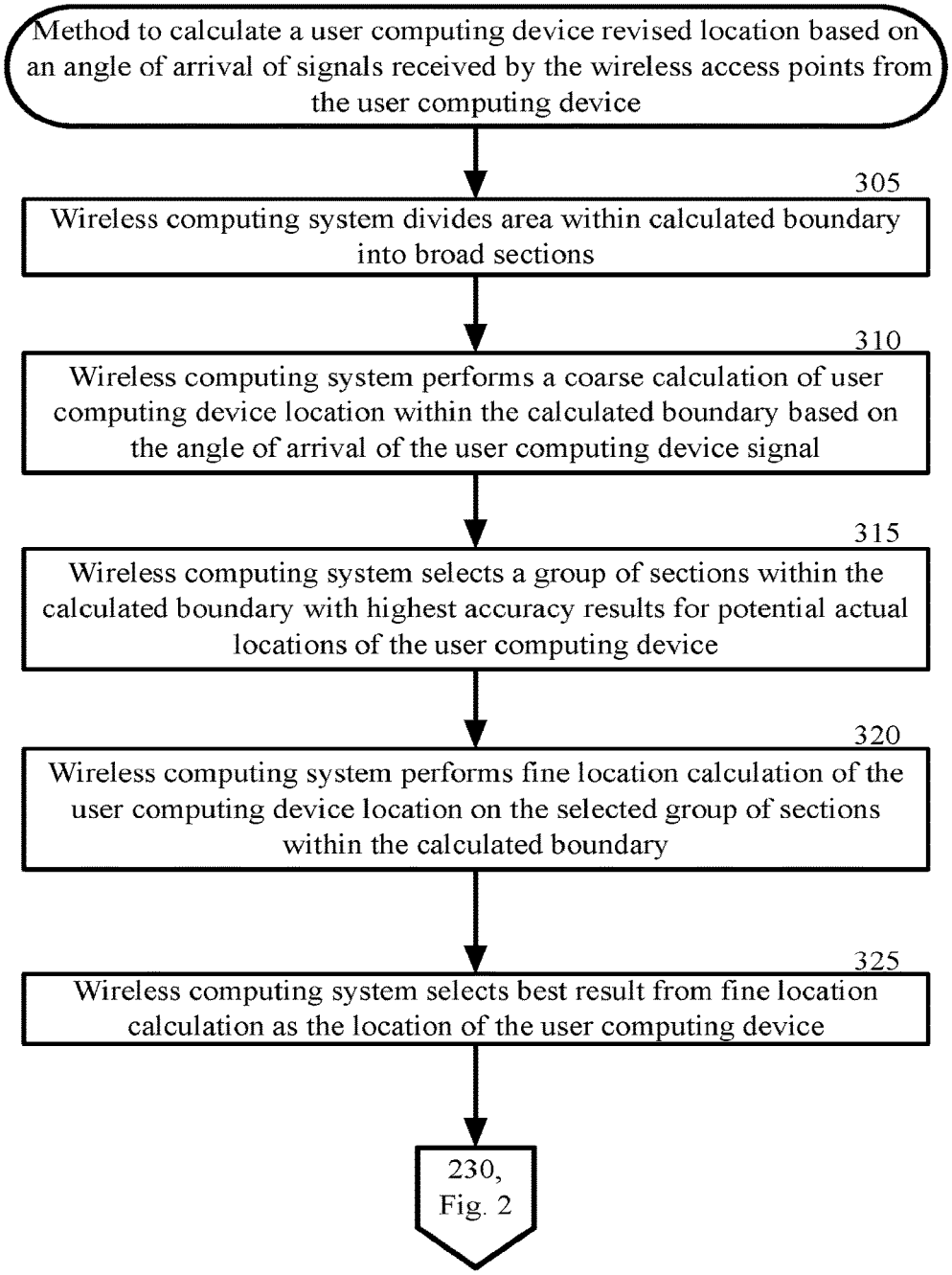
FIG. 3 is a block flow diagram depicting a method to determine a user computing device revised location based on an angle of arrival of signals received by wireless access points from the user computing device, in accordance with example embodiments.

The example methods illustrated in FIGS. 2-3 are described hereinafter with respect to the components of the example operating environment 100. The example methods of FIGS. 2-3 may also be performed with other systems and in other environments.

FIG. 2 is a block flow diagram depicting a method 200 to determine a location of a user computing device 110, in accordance with example embodiments.

With reference to FIGS. 1 and 2, in block 205, a user 101 with a user computing device 110 enters a facility including a wireless computing system 120, which comprises wireless access points 124*a*, 124*b* . . . 124*n* and a wireless system computing device 122. Each wireless access point ("AP") 124*n* may be distributed throughout a particular area of the facility or throughout the entire facility. For example, two or more APs 124*n* may be distributed in different sections of a mall or office building.

Each AP 124*n* may be situated to transmit and receive Wi-Fi or other signals in a particular area of the facility. In another example, the APs 124*n* are distributed throughout indoor or outdoor areas of a hotel, an airport, an office complex, a sports area, a park, a campground, a shopping center, or any other suitable location that desires to provide a Wi-Fi signal to the general public, employees, invited guests, or any other suitable users. The Wi-Fi signal provided by the APs 124*n* may be free, require a fee, require a password, or any other suitable requirements. The Wi-Fi signal may use any other wireless communication technology, such as Bluetooth, infrared, cellular, or any other suitable technology.

The user 101 may enter the location serviced by the APs 124*n*. The user 101 may have a user computing device 110, such as a mobile smartphone, that is in use or stored in a pocket, a bag, or other suitable location. In examples, the user 101 must activate a Wi-Fi service on the user computing device 110 to practice certain steps of the described methods.

In block 210, one or more of the APs 124*n* initiates a communication with the user computing device 110. Each AP 124*n* may transmit a beacon signal or other communication that the user computing device 110 recognizes as an invitation form to initiate a communication session. In another example, the user computing device 110 may provide a communication that the AP 124*n* recognizes as an invitation to initiate a communication session.

The user computing device 110 and each AP 124*n* may provide identification information to each other to establish the communication session.

In block 215, the wireless computing system 120 calculates a first location of the user computing device 110 based on the received signal strength indication ("RSSI") of the signal received by the APs 124*n* from the user computing device 110. Any calculations or other processing described herein as being performed by an AP 124*n*, may be performed by the wireless system computing device 122 or other function of the wireless computing system 120. Any calculations or other processing described herein as being performed by the wireless system computing device 122 may be performed by any AP 124*n* or any other function of the wireless computing system 120.

The RSSI is a measurement made by the AP 124*n* of the power of the signal received from the user computing device 110. For example, when an antenna of the AP 124*n* receives a communication from the user computing device 110, the AP 124*n* determines the power of the incoming signal. The AP 124*n* may convert the power into a scale, such as 0 to 100%, based on the power expected from a category of device to which the user computing device 110 belongs. For example, if the user computing device 110 is a smartphone, then the wireless computing system 120 may compare the power of the received signal to a chart showing the minimum and maximum signals that are expected from a smartphone. The wireless computing system 120 may identify the RSSI value from the chart associated with the received power. Thus, the wireless computing system 120 can assign an RSSI value to the received signal, such as 75%. Any other suitable scale may be used for the RSSI value. In example embodiments, the RSSI value may be a power of the received signal measured in milliwatts.

The wireless computing system 120 may be able to determine the distance from the AP 124*n* that the user computing device 110 is located, based on the RSSI. For example, the RSSI value will decrease the farther away from the AP 124*n* that the user computing device 110 is located. As a user computing device 110 gets closer to an AP 124, the signal strength, and thus the RSSI value, typically improves.

The wireless computing system 120 may compare the RSSI value with the RSSI value determined for the user computing device 110 using a signal received by another AP 124. For example, the wireless computing system 120 may determine an RSSI value for the user computing device 110 signal received by AP 124a and compare the RSSI value with an RSSI value for the user computing device 110 determined by a signal received by AP 124b.

By comparing the two RSSI values, the wireless computing system 120 estimates a location of the user computing device 110. For example, the wireless computing system 120 may triangulate a position based on the differences in the received RSSIs. In another example, any number of APs 124n may be used to triangulate the position of the user computing device 110, such as three, five, or ten.

Figure 4:
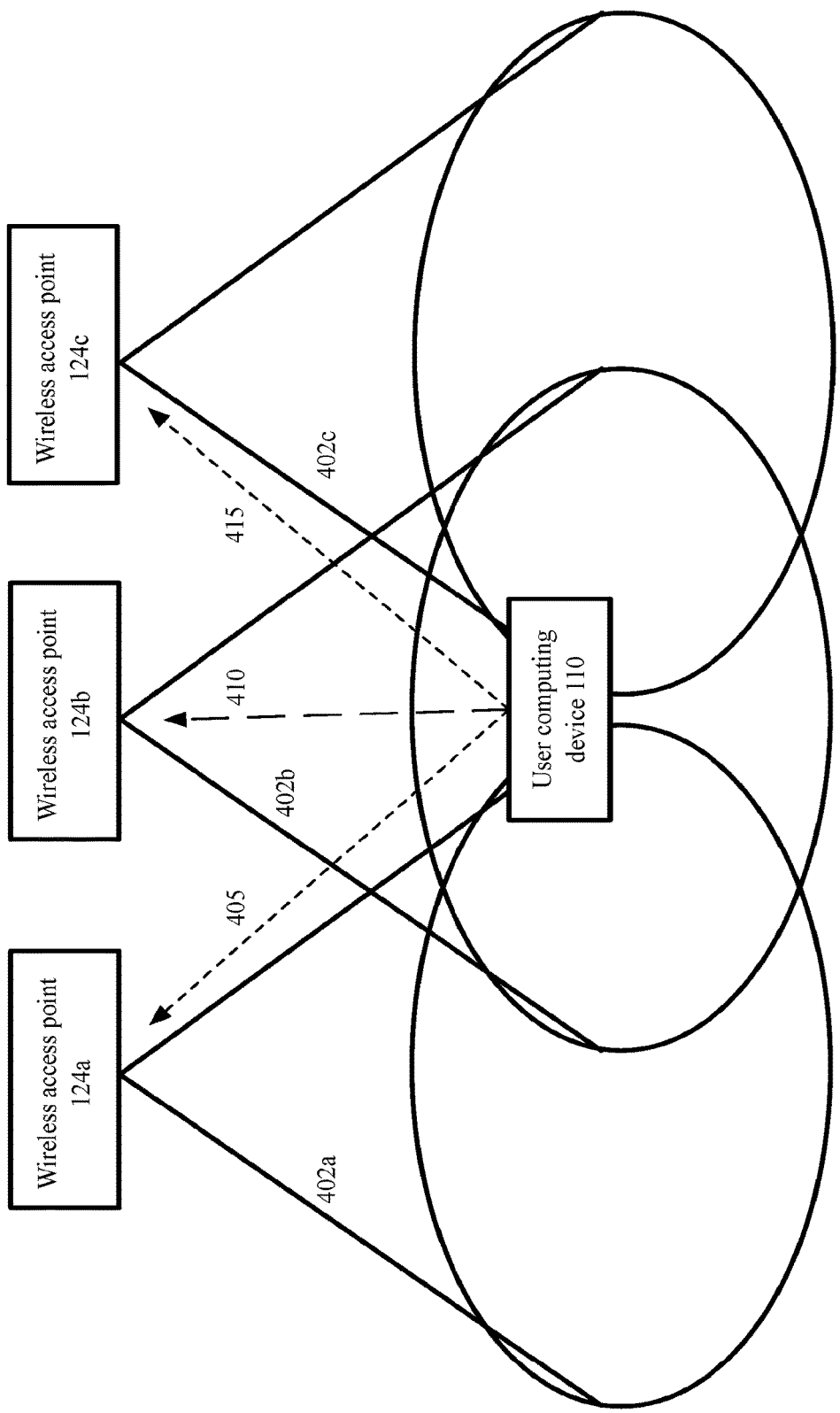
FIG. 4 is an illustration of a user computing device in communication with three wireless access points, in accordance with example embodiments.

FIG. 4 is an illustration of a user computing device 110 in communication with three wireless system APs 124a-c, in accordance with example embodiments. The user computing device 110 is in range of each of the three APs 124a-c and communicates with each. The cone under each of the APs 124a-c is represented by 402a, 402b, and 402c. The cones 402a-c represent a region in which a user computing device 110 is able to conduct a steady, uninterrupted communication with each respective AP 124a-c, in accordance with example embodiments. In the example, the steady, uninterrupted communication is broadcast and received from the APs 124a-c in a 90 degree range under the APs 124a-c. The range forms a "cone" under the APs 124a-c having a base that is larger as the signal moves away from the AP 124n. The user computing device 110 in FIG. 4 is shown within the cone 402b under the AP 124b, but only partially within the cone 402a,c of APs 124a,c.

The dashed lines 405, 410, 415 in FIG. 4 represent the signal from the user computing device 110 being transmitted to the APs 124a-c. The dashed line 410 is shown as bigger than the dashed lines 405, 415 to represent that the signal from under then cone of AP 124b is stronger and more stable than a signal from a user computing device 110 that is not under the cone. The angle of dashed line 410 is shown as 90 degrees from horizontal, or substantially vertical. This angle indicates that the user computing device is directly underneath the AP 124b. The angle of the dashed lines 405, 415 is shown as being less than 45 degrees from horizontal. This angle indicates that the user computing device 110 is not within a cone under the APs 124a,c. The angle of the dashed lines 405, 415 would provide a weaker signal to the APS 124a,c.

As illustrated in FIG. 4, the user computing device 110 receives a better signal from AP 124b, which is closer to the location of the user computing device 110. The signal strength received by each of the three APs 124a-c may be used to triangulate the position of the user computing device 110 as described herein in block 215. For example, based on the greater signal strength received by AP 124b and the lesser, but approximately equal, signal strengths received by AP 124a and AP 124c, the wireless computing system 120 may determine that the user computing device 110 is substantially below the AP 124b.

Figure 5:
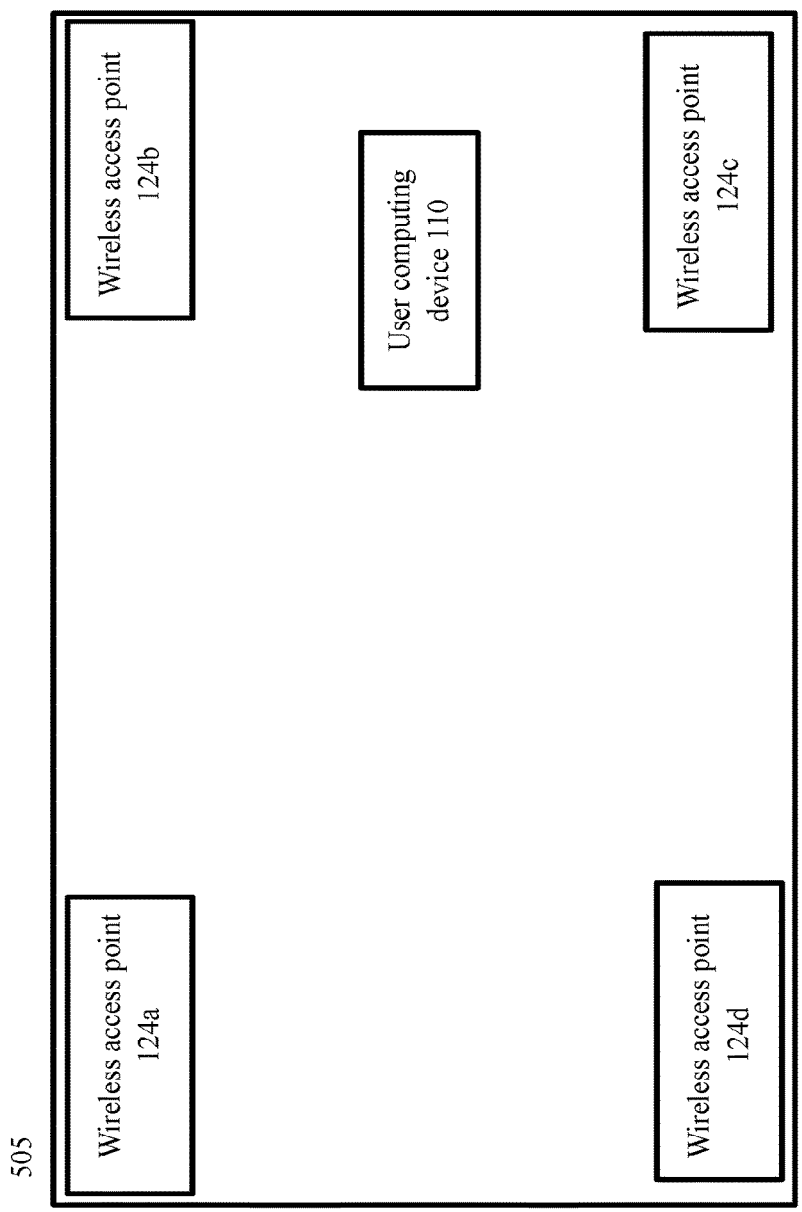
FIG. 5 is an illustration of a position of the user computing device relative to four wireless access points, in accordance with example embodiments.

FIG. 5 is an illustration of a position of the user computing device 110 relative to four wireless access points 124a-d, in accordance with example embodiments. In the example, the user computing device 110 and the APs 124a-d are shown in a facility 505. The facility 505 utilizes the four access points 124a-d, which are placed in the four corners of the facility.

A location of the user computing device 110 determined based on the RSSI values is typically a robust measurement that produces a repeatable location. However, the location based on the RSSI is typically not as accurate as other available location based systems. For example, the RSSI-based location is typically accurate to within only five to eight meters.

Returning to FIG. 2, in block 220, the wireless computing system 120, calculates a boundary encompassing the calculated first location of the user computing device. The boundary may be a square, circle, or other shape centered around or otherwise encompassing the RSSI-based location. The method 200 herein refers to the shape as a square as an example. Any other suitable shape may be used.

The size of the square, may be based on a projected accuracy of the determined RSSI location, where a larger size is used for a lower projected accuracy compared to a smaller size being used for a higher projected accuracy. The size of the square can be configured to encompass the entirety of the potential location of the user computing device 110. For example, if a higher number of APs 124n were able to triangulate a strong signal from a user computing device 110, then the wireless computing system 120 may determine that the accuracy of the RSSI location is high, such as within three meters. In this case, the boundary is determined to encompass the smaller area corresponding to the determined accuracy. If only two APs 124n are used to triangulate a weak signal, then the accuracy may be lower, such as within ten meters. In this case, the boundary is determined to encompass the relatively larger area corresponding to the determined accuracy. In another example, the size of the square is a configured value placed around the first location and does not change based on the RSSI calculation. In an example, the size of the square is 32 feet by 32 feet.

Figure 6:
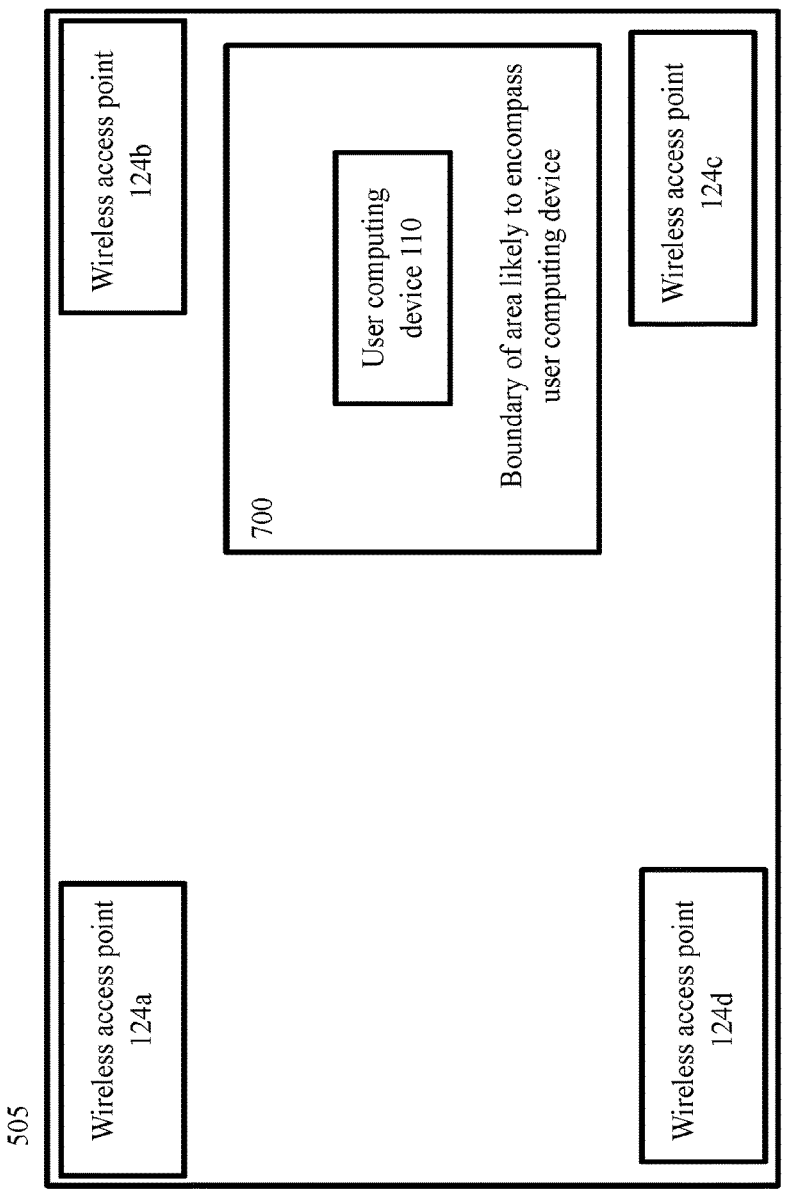
FIG. 6 is an illustration of a boundary encompassing a likely user computing device location determined based on received signal strength, in accordance with example embodiments.

FIG. 6 is an illustration of a boundary 700 encompassing a likely user computing device 110 location determined by an RSSI calculation, in accordance with example embodiments. As described in block 220, the boundary 700 may be a square, circle, or other shape centered on or otherwise encompassing the RSSI-based location of the user computing device. The size and location of the boundary 700 is based on the RSSI calculation as described in block 220.

Returning to FIG. 2, in block 225, the wireless computing system 120 calculates a revised user computing device location based on an angle of arrival of signals of the user computing device 110. Block 225 is described in greater detail hereinafter with reference to FIG. 3.

FIG. 3 is a block flow diagram depicting a method 225 to calculate a revised user computing device location based on the angle of arrival of a signal from the user computing device 110, in accordance with example embodiments.

In block 305, the wireless computing system 120 divides an area created by the established boundary into broad sections. For example, if the boundary is 32 feet by 32 feet, then the boundary may be divided into 8 feet by 8 feet sections. The broad sections may be any other suitable size, such as 6 feet by 6 feet, or 10 feet by 10 feet. The size of the sections may be selected based on the size of the established boundary. For example, a larger boundary may require larger broad sections, as well as a greater number of sections. In an example, the area within the boundary may be divided into a preconfigured number of sections, regardless of the size of the area.

In block 310, the wireless computing system 120 performs a coarse calculation of the location of the user computing device 110 within the calculated boundary based on the angle of arrival of the signal received by the APs 124n from the user computing device 110.

To obtain a location of a user computing device 110 based on the angle of arrival of the signal, the wireless computing system 120 measures the angle from which the signal arrives. The angle of arrival may be measured by an array of antennas on the AP 124n to differentiate the angle or by any other suitable method of determining the angle of arrival. The angle of arrival may be measured in a number of degrees from a constant direction, such as "north." Alternatively, the angle of arrival may be a relative direction described in other suitable terms.

If two or more APs 124n, receive the signal from the user computing device 110, then the wireless computing system 120 may utilize both measurements to more accurately calculate the location of the user computing device 110. For example, the wireless computing system 120 may determine an angle of arrival value for the user computing device 110 based on the signal received by AP 124a and compare the angle of arrival value with an angle of arrival value for the user computing device 110 based on the signal received by AP 124b.

By comparing the two angle of arrival values, the wireless computing system 120 calculates an estimated location of the user computing device 110 within the boundary determined in block 220, discussed previously. For example, the wireless computing system 120 may triangulate a position based on the differences in the received angle of arrival values. In another example, any number of APs 124n may be used to triangulate the position of the user computing device 110, such as three, five, or ten. Typically, a greater number of APs 124n involved in the calculation, the greater the accuracy of the estimated location.

The location of the user computing device 110 based on angle of arrival is typically more accurate than the location determined based on the RSSI values. For example, this accuracy based on angle of arrival may be within 2 meters. However, an angle of arrival-based location typically is more susceptible to signal noise and other disruptions than the location determined based on the RSSI values. This susceptibility causes false data to occasionally be reported. The false data can provide a location output that is significantly outside of a usual error distance.

To counter this effect, the calculation in block 310 is a coarse calculation to limit the amount of processing power required to perform the calculation. A coarse calculation will not provide as accurate, or as thorough, of an analysis of the received data as a fine calculation would provide. A fine calculation will provide more accurate and thorough data, but will require more processing capacity and processing usage. A course calculation is performed on a larger area with larger sections than a fine calculation. The fine calculation may use a similar calculation method as a coarse calculation, but on a smaller area with smaller sections. When analyzing data from a smaller section, the same amount of processing capacity will produce a more accurate result.

In an example embodiment, if an area to be analyzed to determine the most likely location of a user computing device 110 is large, then a fine calculation over that large area will require a burdensome amount of processing by the wireless computing system 120. Thus, a fine calculation may be reserved for a smaller area to conserve processing capacity.

In block 315, the wireless computing system 120 selects a group of broad sections within the calculated boundary with highest accuracy results for potential actual locations of the user computing device 110. The wireless computing system 120 analyzes the results of the coarse calculation and selects a group of the broad sections that have the highest likelihood of being the correct location of the user computing device 110. That is, the results from each broad section provide a likelihood that the user computing device 110 is in that section. The wireless computing system 120 compares the results and ranks the likelihoods for each section. The wireless computing system 120 then selects a configured number of the sections that are ranked the highest. For example, the AP wireless computing system 120 may select 2, 3, 5, 7, 10, or any other specified number of broad sections to be in the group.

Figure 7:
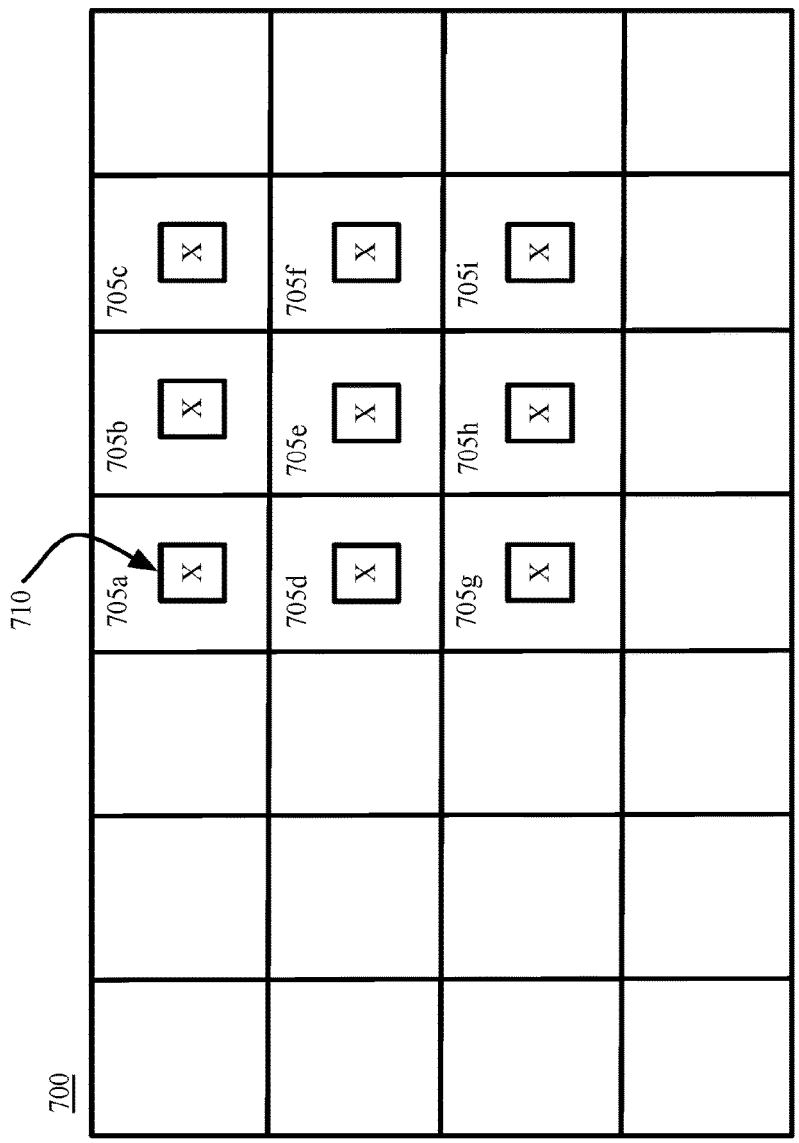
FIG. 7 is an illustration of the boundary divided into broad sections and with higher ranked sections selected, in accordance with example embodiments.

FIG. 7 is an illustration of the boundary 700 divided into broad sections and with higher ranked sections selected, in accordance with example embodiments as described in block 315. For example, after the boundary 700 was selected, the boundary 700 was broken into broad sections as shown in FIG. 7. After the coarse calculation was performed on the broad sections as described in block 310, the broad sections are ranked based on the results. In the example, the highest ranked nine broad sections 705a-i are denoted with an X 710. Each X 710 denotes that the broad sections 705a-i are selected for further evaluation as the user computing device 110 may be located in one of section 705a-i.

Returning to FIG. 3, in block 320, the wireless computing system 120 performs a fine location calculation of the location of the user computing device 110 on the selected group of sections within the calculated boundary. Because the number of selected broad sections is smaller than the total number of broad sections inside the boundary, the processing power required to perform the fine calculation is less than would be required to perform a fine calculation on the entire area within the boundary.

The fine calculation uses the angle of arrival of the signal from the user computing device 110 to the one or more APs 124n in a similar manner as described with respect to the coarse calculation from block 310. However, the fine calculation performs a more thorough analysis of the data and obtains a more accurate result for each section. For example, the fine calculation segments an area to be searched into much smaller segments than the coarse calculation and applies the calculation to each segment. For example, a coarse calculation may divide the area into segments that are 3 meters by 3 meters, and then search each segment. However, a fine calculation may divide the smaller area into segments that are 1 meter by 1 meter or 0.5 meters by 0.5 meters, and then search each segment. Because of the smaller segments, the fine calculation produces a more accurate result. The results of the fine calculation may produce a location that is accurate to within 2 meters. Performing a fine calculation with segments that are 0.5 meters by 0.5 meters over a larger area would be burdensome for the processor of the wireless computing system.

Figure 8:
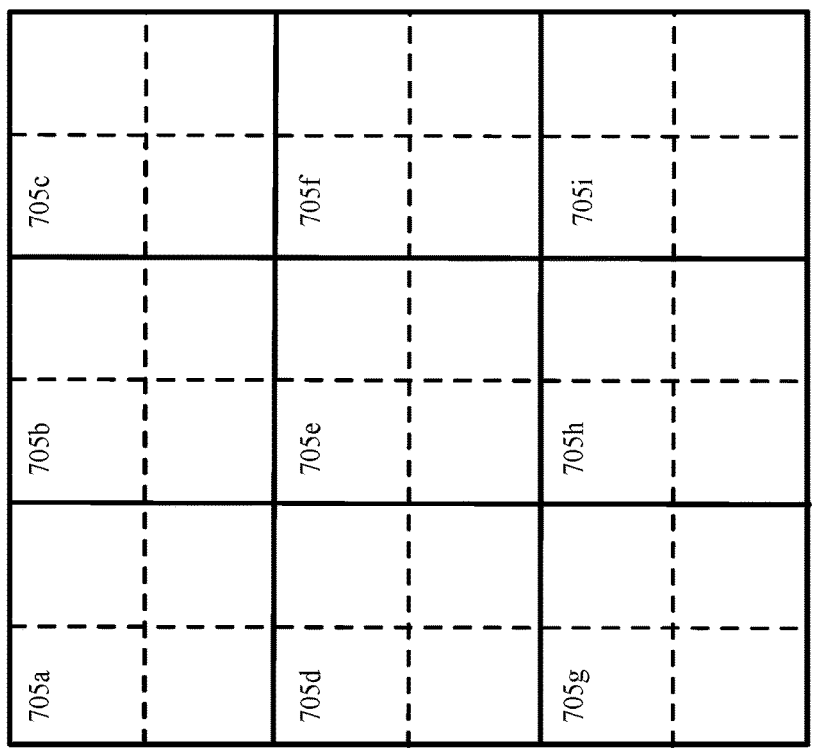
FIG. 8 is an illustration of the selected broad sections divided into small sections, in accordance with example embodiments.

FIG. 8 is an illustration of the selected broad sections 705a-i divided into small sections, in accordance with example embodiments. In the example, each broad section 705a-i is divided into four smaller sections. The wireless computing system 120 performs a fine calculation on each of the small sections. The fine calculation determines a probability for each of the small sections that the user computing device 110 is located in that particular section, as described in block 320.

Returning to FIG. 3, in block 325, the wireless computing system 120 selects the best result from the fine location calculation. The wireless computing system 120 analyzes the results of the fine calculation and selects the section from the group 705a-i that has the highest likelihood of including the correct location of the user computing device 110. That is, the results from each selected section provide a likelihood that the user computing device 110 is in that particular section. The wireless computing system 120 compares the results and ranks the likelihoods for each section. The wireless computing system 120 then selects the section with the highest likelihood. The location of the user computing device 110 is determined to be in the selected section. The wireless computing system 120 determines the location of the user computing device 110 as within the selected section.

From block 320, the method 225 returns to block 230 of FIG. 2.

Returning to FIG. 2, in block 230, the wireless computing system 120 provides location data to the user computing device 100. After selecting the best result, the wireless computing system 120 transmits location data comprising the determined location of the user computing device 110 to the user computing device 110. The location data may be transmitted along the already established communication channels between the user computing device 110 and the wireless computing system 120, such as Wi-Fi.

In block 235, the user computing device 110 displays the location data to the user 101 or provides the location data to any other suitable application. In an example, the wireless computing system 120 provides the determined location data to the user computing device 110 along with instructions to display the location to the user 101 on user interface of a mapping application, or other application, executing on the user computing device 110. In another example, the user computing device 110 stores the location data until the user 101 or an application requests the data. For example, if a user 101 is using a mapping application to monitor the location of the user 101 at a park, the mapping application may periodically or continuously receive location data from the wireless computing system 120 and display the location data on the mapping application. In another example, the location data may be received by the user computing device 110 and accessed by a shopping application. The shopping application can access the location data and use the location data to provide location specific coupons and offers to the user 101 via the shopping application. Any other application or device authorized by the user 101 may utilize the location data.

The angle of arrival location estimation calculation is accurate but may be susceptible to multipath effects that affect the AoA measurements from APs 124n that are not in line of sight communication with the user device 110. The RSSI location estimation calculation is not as accurate, but is more robust in its immunity to multipath effects because the path loss used to generate an estimated RSSI considers the multipath effect over the areas.

In example embodiments, the wireless computing system 120 first estimates the RSSI location. The wireless computing system 120 estimates a confidence factor of this RSSI location. Then, using the estimated RSSI location and the confidence factor, the wireless computing system 120 builds the restricted search boundary. For example, the restricted search boundary can be a square centered around the estimated location.

In example embodiments, the wireless computing system 120 then determines the angle of arrival location estimate over the determined boundary. The system may perform a fine calculation on the sections from the boundary with the highest probability of being the actual location of the user computing device 110. In some cases, when calculating a coarse angle of arrival location, signal peaks may be missed because the signal analysis is not as thorough as with a fine calculation. When signal peaks are not recognized, a location that is farther away may produce a similar probability as the signal in the vicinity of the actual location. Hence, the wireless computing system 120 re-computes the angle of arrival probability with a fine calculation for the top coarse sections and selects the location of the user computing device 110 based on the maximum recomputed probability in each coarse section.

Example Systems

FIG. 9 depicts a computing machine 2000 and a module 2050 in accordance with example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a wearable computer, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology.

It should also be appreciated that the system memory 2030 may include, or operate in conjunction with, a non-volatile storage device such as the storage media 2040.

The storage media 2040 may include a hard disk, a floppy disk, a compact disc read-only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A method, comprising:
    receiving, by each of a plurality of wireless computing system access points (APs) of a wireless computing system, a wireless signal from a user computing device;
    calculating, by the wireless computing system, a boundary encompassing a first estimated location of the user computing device based on a signal strength of the received wireless signal at each AP;
    computing, by the wireless computing system, a second estimated location of the user computing device within the boundary based on an angle of arrival of the signal of the received wireless signal at each AP;
    generating, by the wireless computing system, a third estimated location of the user computing device based the second estimated location; and
    transmitting, by the wireless computing system and to the user computing device, a location based on the third estimated location to indicate the location of the user computing device.

2. The method of claim 1, wherein a size of the boundary is based on an estimated accuracy of the calculation based on the received signal strength, wherein a higher estimated accuracy correlates to a smaller bound area and a lower estimated accuracy correlates to a larger bound area.

3. The method of claim 1, wherein:
    computing the second estimated location of the user computing device based on an angle of arrival of the signal of the received wireless signal at each AP comprises:
        dividing, by the wireless computing system, an area inside the boundary into a plurality of sections; and
        determining, by the wireless computing system, a likelihood for each of the plurality of sections of being an actual location of the user computing device based on the angle of arrival of the signal of the received wireless signal at each AP; and
    generating the final estimated location of the user computing device based the second estimated location comprises:
        computing, by the wireless computing system, the third estimated location across a subset of the plurality of the sections, the subset comprising those sections characterized by a likelihood greater than or equal to the sections not in the subset.

4. The method of claim 3, wherein those sections characterized by a likelihood greater than or equal to sections not in the subset are determined by ranking the sections by likelihood and choosing the N highest ranked sections, where N is a number between 1 and the (total number of sections−1).

5. The method of claim 3, wherein those sections characterized by a likelihood greater than or equal to sections not in the subset are those sections with a likelihood greater than a threshold.

6. The method of claim 3, wherein the computation of the third estimated location is finer than the computation of the second estimated location.

7. A computer program product, comprising:
    a non-transitory computer-readable storage device having computer-executable program instructions embodied thereon that when executed by a computer cause the computer to locate a user computing device, the computer-executable program instructions comprising:
        computer-executable program instructions to receive, by each of a plurality of wireless computing system access points (APs) of a wireless computing system, a wireless signal from a user computing device;
        computer-executable program instructions to calculate, by the wireless computing system, a boundary encompassing a first estimated location of the user computing device based on a signal strength of the received wireless signal at each AP;
        computer-executable program instructions to compute, by the wireless computing system, a second estimated location of the user computing device within the boundary based on an angle of arrival of the signal of the received wireless signal at each AP;
        computer-executable program instructions to generate, by the wireless computing system, a third estimated location of the user computing device based the second estimated location; and
        computer-executable program instructions to transmit, by the wireless computing system and to the user computing device, a location based on the third estimated location to indicate the location of the user computing device.

8. The computer program product of claim 7, wherein a size of the boundary is based on an estimated accuracy of the calculation based on the received signal strength, wherein a higher estimated accuracy correlates to a smaller bound area and a lower estimated accuracy correlates to a larger bound area.

9. The computer program product of claim 7, wherein:
    computing a second estimated location of the user computing device based on an angle of arrival of the signal of the received wireless signal at each AP comprises:
        dividing, by the wireless computing system, an area inside the boundary into a plurality of sections; and
        determining, by the wireless computing system, a likelihood for each of the plurality of sections of being an actual location of the user computing device based on the angle of arrival of the signal of the received wireless signal at each AP; and generating a final estimated location of the user computing device based the second estimated location comprises:
    computing, by the wireless computing system, the third estimated location across a subset of the plurality of the sections, the subset comprising those sections characterized by a likelihood greater than or equal to the sections not in the subset.

10. The computer program product of claim 9, wherein those sections characterized by a likelihood greater than or equal to sections not in the subset are determined by ranking the sections by likelihood and choosing the N highest ranked sections, where N is a number between 1 and the (total number of sections−1).

11. The computer program product of claim 9, wherein those sections characterized by a likelihood greater than or equal to sections not in the subset are those sections with a likelihood greater than a threshold.

12. The computer program product of claim 9, wherein the computation of the third estimated location is finer than the computation of the second estimated location.

13. A system, comprising:
a storage device; and
a processor communicatively coupled to the storage device, wherein the processor executes application code instructions that are stored in the storage device to cause the system to:
    receive, by each of a plurality of wireless computing system access points (APs) of a wireless computing system, a wireless signal from a user computing device;
    calculate, by the wireless computing system, a boundary encompassing a first estimated location of the user computing device based on a signal strength of the received wireless signal at each AP;
    compute, by the wireless computing system, a second estimated location of the user computing device within the boundary based on an angle of arrival of the signal of the received wireless signal at each AP;
    generate, by the wireless computing system, a third estimated location of the user computing device based the second estimated location; and
    computer-executable program instructions to transmit, by the wireless computing system and to the user computing device, a location based on the third estimated location to indicate the location of the user computing device.

14. The system of claim 13, wherein a size of the boundary is based on an estimated accuracy of the calculation based on the received signal strength, wherein a higher estimated accuracy correlates to a smaller bound area and a lower estimated accuracy correlates to a larger bound area.

15. The system of claim 13, wherein:
computing a second estimated location of the user computing device based on an angle of arrival of the signal of the received wireless signal at each AP comprises:
    dividing, by the wireless computing system, an area inside the boundary into a plurality of sections; and
    determining, by the wireless computing system, a likelihood for each of the plurality of sections of being an actual location of the user computing device based on the angle of arrival of the signal of the received wireless signal at each AP; and
generating a final estimated location of the user computing device based the second estimated location comprises:
    computing, by the wireless computing system, the third estimated location across a subset of the plurality of the sections, the subset comprising those sections characterized by a likelihood greater than or equal to the sections not in the subset.

16. The system of claim 15, wherein those sections characterized by a likelihood greater than or equal to sections not in the subset are determined by ranking the sections by likelihood and choosing the N highest ranked sections, where N is a number between 1 and the (total number of sections−1).

17. The system duct of claim 15, wherein those sections characterized by a likelihood greater than or equal to sections not in the subset are those sections with a likelihood greater than a threshold.

18. The system of claim 15, wherein the computation of the third estimated location is finer than the computation of the second estimated location.

* * * * *